(12) United States Patent
Horton et al.

(10) Patent No.: US 7,306,284 B2
(45) Date of Patent: Dec. 11, 2007

(54) ADJUSTOR FOR JUVENILE VEHICLE SEAT

(75) Inventors: William Horton, Hope, IN (US); Philip W. Burbrink, Columbus, IN (US); Jason Crowell, Columbus, IN (US)

(73) Assignee: Cosco Management, Inc., Wilmington, DE (US)

( * ) Notice: Subject to any disclaimer, the term of this patent is extended or adjusted under 35 U.S.C. 154(b) by 471 days.

(21) Appl. No.: 10/811,181

(22) Filed: Mar. 26, 2004

(65) Prior Publication Data

US 2005/0225136 A1    Oct. 13, 2005

(51) Int. Cl.
*B60N 2/28* (2006.01)
(52) U.S. Cl. ................. 297/250.1; 297/256.11
(58) Field of Classification Search ......... 297/250.1, 297/256.11, 256.1, 410, 353
See application file for complete search history.

(56) References Cited

U.S. PATENT DOCUMENTS

| | | | |
|---|---|---|---|
| 2,143,634 A | 1/1939 | Saunders |
| 3,198,575 A | 8/1965 | Hawkins |
| 3,572,827 A | 3/1971 | Merelis |
| 3,948,556 A | 4/1976 | Hyde et al. |
| 4,040,664 A | 8/1977 | Tanaka et al. |
| 4,047,755 A | 9/1977 | McDonald et al. |
| 4,058,342 A | 11/1977 | Ettridge |
| 4,168,050 A | 9/1979 | Nerem et al. |
| 4,205,877 A | 6/1980 | Ettridge |
| 4,342,483 A | 8/1982 | Takada |
| 4,376,551 A | 3/1983 | Cone |
| 4,545,617 A | 10/1985 | Drexler et al. |
| 4,632,456 A | 12/1986 | Kassai |
| 4,709,960 A | 12/1987 | Launes |
| 4,790,601 A | 12/1988 | Burleigh et al. |
| 4,854,639 A | 8/1989 | Burleigh et al. |
| 4,858,997 A | 8/1989 | Shubin |
| 4,915,446 A | 4/1990 | Darling et al. |
| 4,936,629 A | 6/1990 | Young |
| 4,971,392 A | 11/1990 | Young |
| 5,082,325 A | 1/1992 | Sedlack |
| 5,181,761 A | 1/1993 | Meeker |
| 5,335,964 A | 8/1994 | Sedlack et al. |
| 5,344,213 A | 9/1994 | Koyanagi |
| 5,468,046 A | 11/1995 | Weber et al. |
| 5,527,094 A | 6/1996 | Hiramatsu et al. |
| 5,580,126 A | 12/1996 | Sedlack |

(Continued)

FOREIGN PATENT DOCUMENTS

GB    2143727    2/1985

(Continued)

*Primary Examiner*—David Dunn
*Assistant Examiner*—Noah Chandler Hawk
(74) *Attorney, Agent, or Firm*—Barnes & Thornburg LLP

(57) ABSTRACT

A juvenile seat includes a seat shell having a bottom seat portion and a back support portion coupled to the bottom seat portion and positioned at an angle relative to the bottom seat portion. A headrest of the juvenile seat is coupled to the seat shell and arranged for up and down movement relative to the seat shell above the bottom seat portion of the seat shell. The juvenile seat also includes a height-adjustment mechanism coupled to the headrest for up and down movement with the headrest to adjust the height of the headrest above the bottom seat portion.

43 Claims, 6 Drawing Sheets

U.S. PATENT DOCUMENTS

| | | | |
|---|---|---|---|
| 5,609,393 A | 3/1997 | Meeker et al. | |
| 5,625,956 A | 5/1997 | Cone, II et al. | |
| 5,775,772 A | 7/1998 | Lefranc | |
| 6,030,047 A | 2/2000 | Kain | |
| 6,135,553 A | 10/2000 | LoVie et al. | |
| 6,155,638 A | 12/2000 | Bapst | |
| 6,189,970 B1 | 2/2001 | Rosko | |
| 6,398,302 B1 | 6/2002 | Freedman et al. | |
| 6,428,099 B1 | 8/2002 | Kain | |
| 6,464,294 B1 * | 10/2002 | Kain | 297/250.1 |
| 6,491,348 B1 | 12/2002 | Kain | |
| 6,616,235 B1 * | 9/2003 | Khavari et al. | 297/408 |
| 6,623,074 B2 | 9/2003 | Asbach et al. | |
| 6,626,493 B2 | 9/2003 | Kain | |
| 6,659,564 B2 | 12/2003 | Kassai et al. | |
| 6,811,216 B2 * | 11/2004 | Sedlack | 297/250.1 |
| 2002/0043837 A1 * | 4/2002 | Kain | 297/250.1 |
| 2002/0195867 A1 | 12/2002 | Barger et al. | |
| 2004/0124678 A1 | 7/2004 | Williams et al. | |

FOREIGN PATENT DOCUMENTS

| | | |
|---|---|---|
| GB | 2 282 321 | 4/1985 |

* cited by examiner

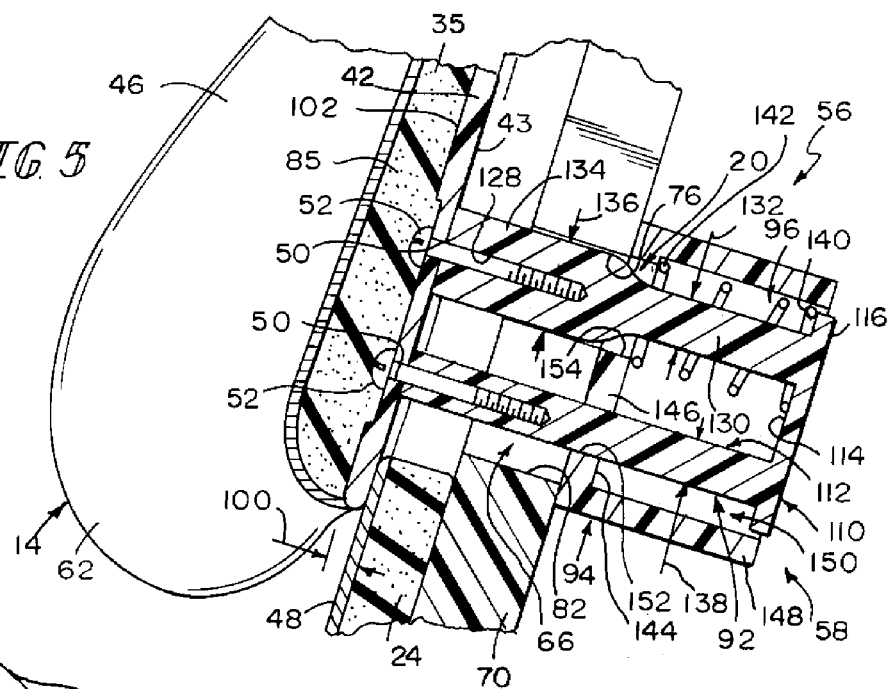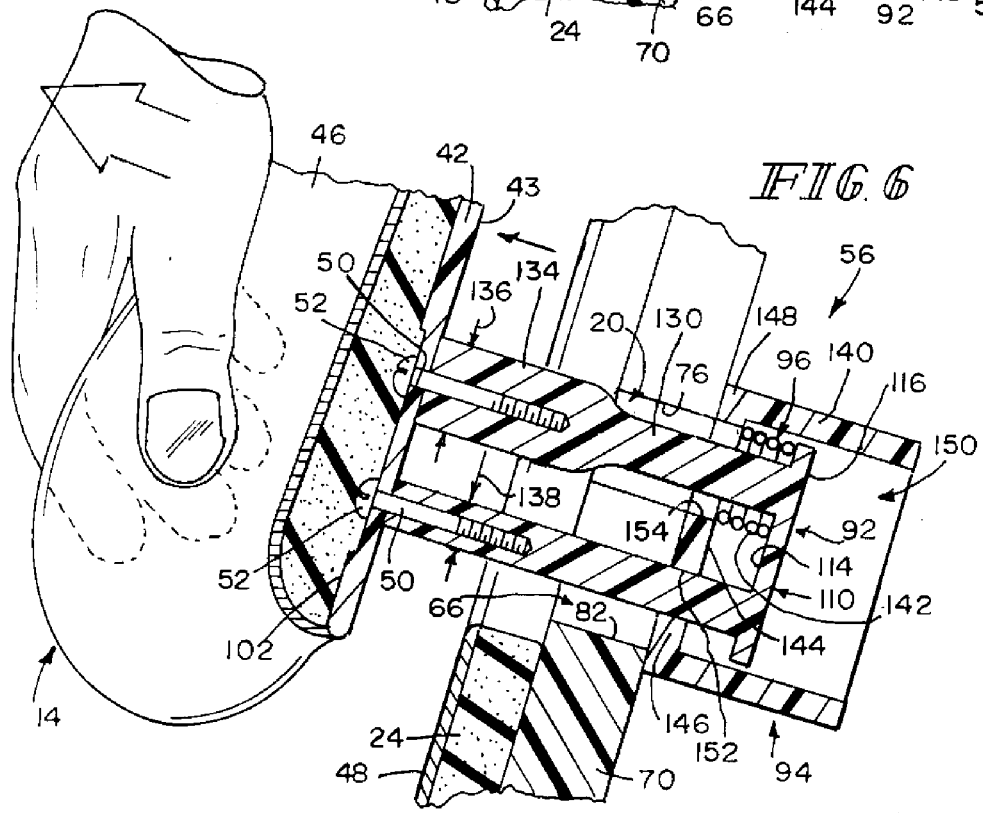

ADJUSTOR FOR JUVENILE VEHICLE SEAT

BACKGROUND

The present disclosure relates to juvenile vehicle seats and particularly to juvenile vehicle seats having a seat shell and a headrest movable up and down relative to the seat shell. Specifically, the present disclosure relates to a height-adjustment mechanism for raising and lowering the headrest.

Many juvenile vehicle seats are formed to include a headrest which adjusts upwardly and downwardly relative to a bottom seat portion of the juvenile seat. Such a juvenile seat can be adapted by a user to seat children of different sizes.

SUMMARY

According to the present disclosure, a juvenile seat includes a seat shell having a bottom seat portion and a back support portion coupled to the bottom seat portion and positioned at an angle relative to the bottom seat portion. A headrest of the juvenile seat is coupled to the seat shell and is arranged for up and down movement relative to the seat shell to adjust a height of the headrest above the bottom seat portion of the seat shell.

The juvenile seat further includes a height-adjustment mechanism including a locking pin coupled to the headrest and a vertical slot provided in the back support portion of the seat shell. The locking pin is coupled to the headrest for up and down movement with the headrest. The locking pin is also received through the vertical slot of the height-adjustment mechanism. The vertical slot defines vertically-spaced position indicators formed to receive the locking pin in a locked position to prevent the headrest from moving upwardly and downwardly relative to the seat shell.

The locking pin includes a first portion having a first diameter and a second portion coupled to the first portion and having a second diameter larger than the first diameter. The second portion of the locking pin is positioned within one of the position indicators in the locked position and is disengaged from the position indicators in an unlocked position to permit the headrest to move upwardly and downwardly relative to the seat shell.

The headrest and locking pin are arranged to move in a direction generally perpendicular to a plane formed through the back support portion when moving between the locked and unlocked positions. Further, the rear surface of the headrest is engaged with the back support portion in the locked position and is spaced-apart from the back support portion in the unlocked position.

Features of the present disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompanying figures in which:

FIG. 5 is a sectional view of one of the actuators taken along line 5-5 of FIG. 1 showing the actuator in a locked position to prevent up and down movement of the headrest and showing a larger diameter portion of the locking pin received within a position aperture or indicator of the vertical slot;

FIG. 6 is a sectional view similar to FIG. 5 showing a user having pulled the headrest away from a back support portion of the seat shell to move the actuator to an unlocked position where the larger diameter portion of the locking pin is disengaged from the position indicator of the vertical slot to permit up and down movement of the headrest relative to the seat shell;

DETAILED DESCRIPTION

A juvenile vehicle seat 10 is provided to support juveniles. Juvenile seat 10 may be coupled to a seat (not shown) within a vehicle (not shown) for example, to secure the juvenile within the vehicle. Although reference is made to a juvenile vehicle seat 10, it is within the scope of this disclosure to include juvenile booster seats or other such seats for supporting and securing juveniles within a vehicle or other structure.

Figure 9:
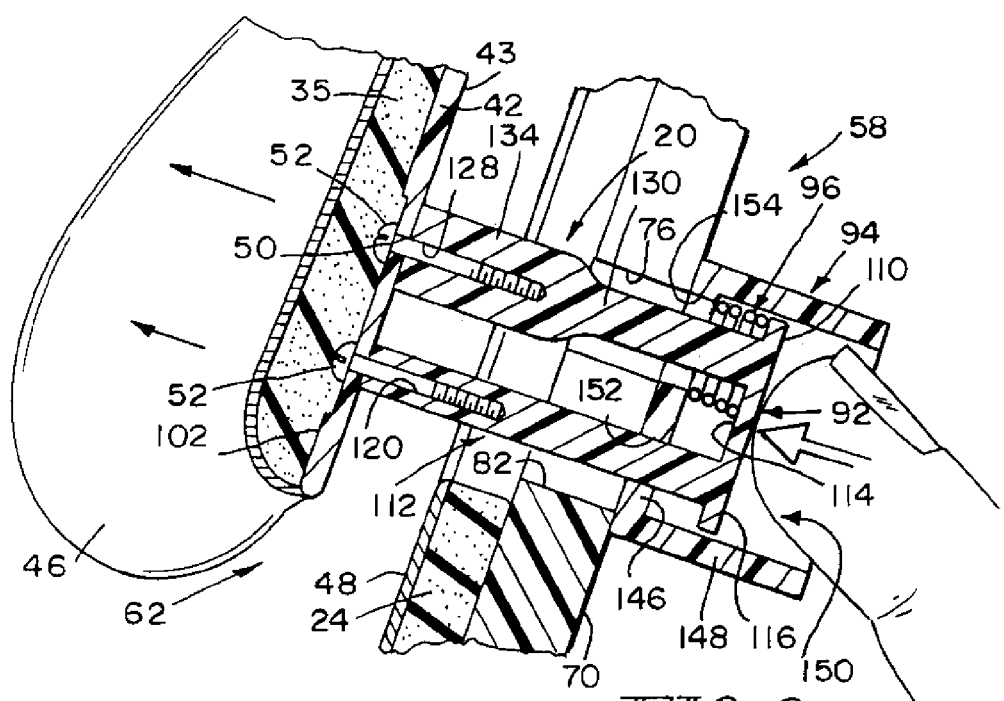
FIG. 9 is a sectional view similar to FIGS. 5-8 showing an alternative, rear-actuated method of moving the actuator to the unlocked position by pushing on a rear surface of the engagement bracket against the bias of the spring to release the larger diameter portion of the locking pin from within the position indicator of the vertical slot.
Figure 10:
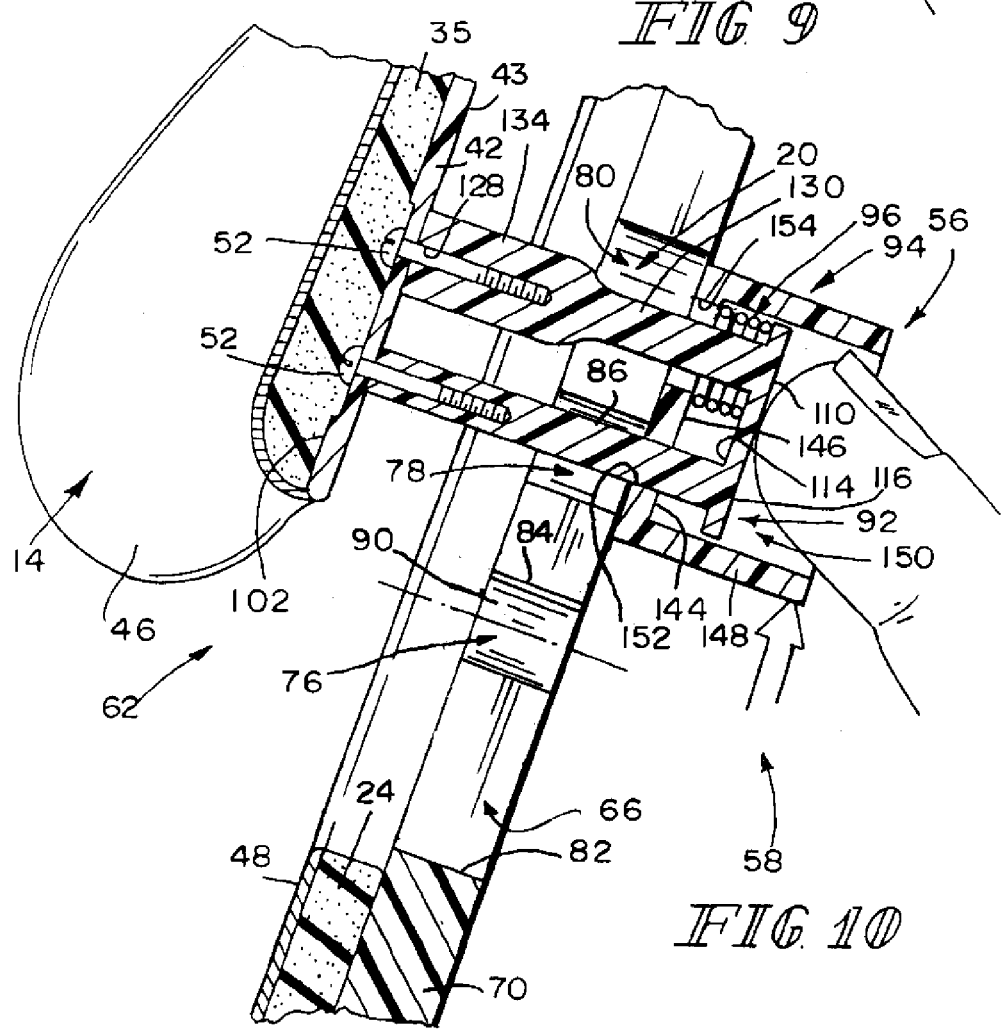
FIG. 10 is a sectional view similar to FIG. 9 showing the user moving the headrest upwardly toward the highest position above the bottom seat portion of the seat shell.

Juvenile seat 10 includes a height-adjustment mechanism 12 (see FIG. 3) for adjusting the height of a headrest 14 of the seat 10 up and down relative to a bottom seat portion 16 of a seat shell 18 of the seat 10. Headrest 14 may be moved from a lowered or lowest position shown in FIG. 1 to a raised or highest position shown in FIG. 2 by operating height-adjustment mechanism 12 as shown in FIGS. 5-10 to release a locking post or pin 20 coupled to headrest 14 from within a position indicator 22 provided in a back support portion 24 of seat shell 18. A user may adjust a height of headrest 14 from the front of seat 10, as shown in FIGS. 5-8, and may also adjust a height of headrest 14 from the rear of seat 10, as shown in FIGS. 9 and 10. In other words, seat 10 provides a user with front- and rear-actuated methods of adjusting the height of headrest 14 above bottom seat portion 16. Further, as shown in FIG. 5, a small offset distance 100 is provided between mating portions of the headrest 14 and back support portion 24. This small offset distance provides a smooth and continuous backrest surface for the juvenile seated within seat 10.

Figures 1, 2:
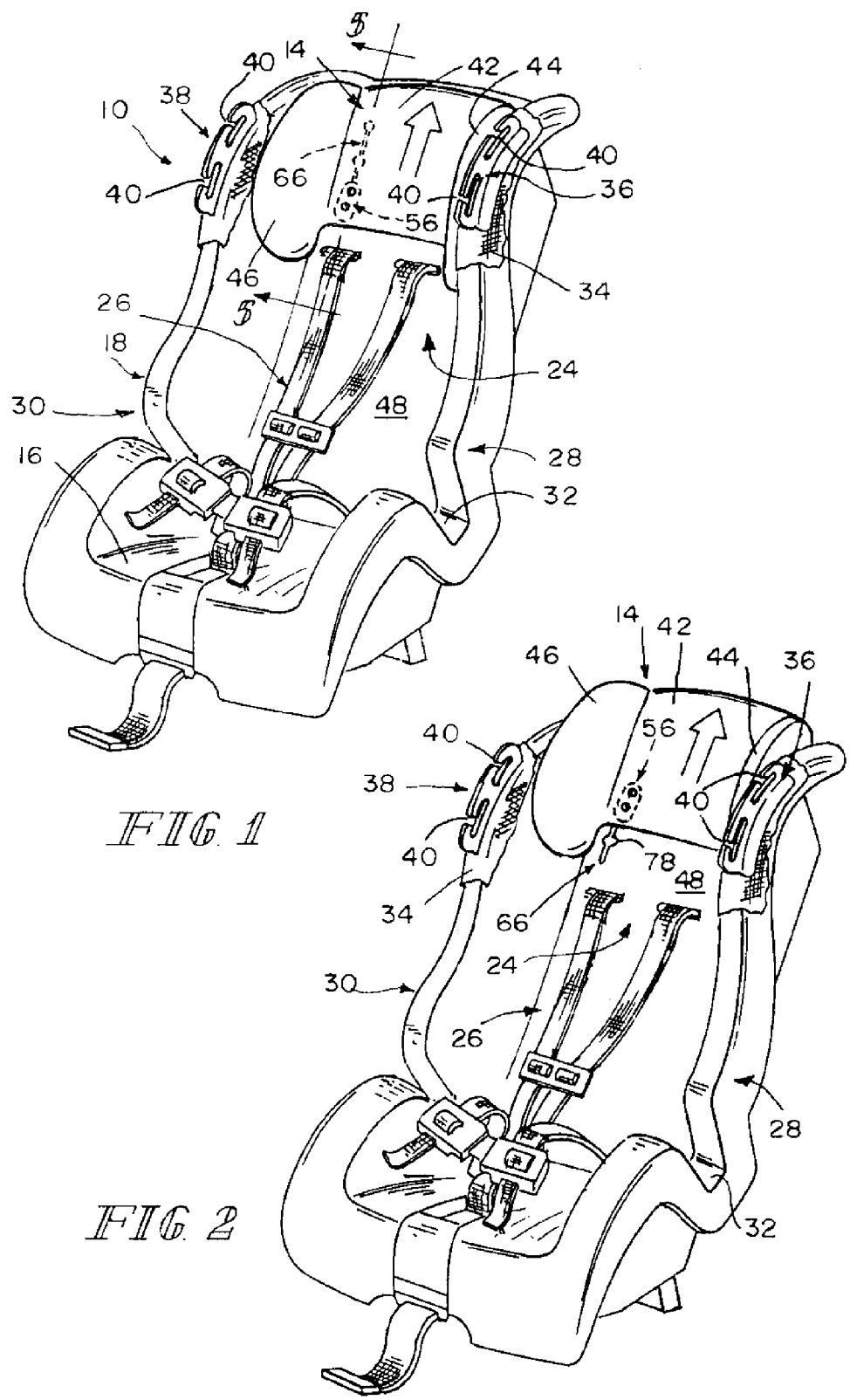
FIG. 1 is a front perspective view of a juvenile vehicle seat including a seat shell, a child-restraint harness, and a headrest movable up and down relative to the seat shell, and further showing the headrest located in a lowest position above a bottom seat portion of the seat shell.
FIG. 2 is a front perspective view of the seat of FIG. 1 showing the headrest having been moved relative to the seat shell to a highest position above the bottom seat portion of the seat shell.

As shown in FIG. 1, juvenile vehicle seat 10 includes seat shell 18, headrest 14 coupled to seat shell 18, and a child-restraint harness 26 also coupled to seat shell 18 to restrain a juvenile within seat shell 18. Seat shell 18 includes bottom seat portion 16 adapted to support a juvenile's bottom and upper legs thereon, back support portion 24 coupled to bottom seat portion 16 and positioned to lie at an angle relative thereto, and a pair of side walls 28, 30 each coupled to back support portion 24 and bottom seat portion 16, as shown in FIGS. 1 and 2. Side walls 28, 30 are provided for preventing lateral movement of the juvenile seated in seat 10 and are located on opposite sides of both bottom seat portion 16 and back support portion 24. A notch 32 is formed in each side wall 28, 30 for receiving a portion of a seat belt (not shown) of the vehicle (not shown) to position a portion of the seat belt over a juvenile's lap, for example, when the juvenile is seated on bottom seat portion 16.

Seat 10 also includes a cloth or covering 34 to cover seat shell 18 and cloth or covering 35 to cover headrest 14. Seat 10 further includes a pair of shoulder belt guides 36, 38 each coupled to an upper portion of a respective side wall 28, 30 of seat shell 18. Each illustrative guide 36, 38 includes two substantially "T-shaped" slots 40 formed to receive a shoulder belt portion (not shown) of a vehicle seat belt system properly to position and thread the shoulder belt portion of the seat belt system over seat 10. Although illustrative guides 36, 38 each provide two slots 40 or positions for the vehicle shoulder belt, it is within the scope of this disclosure to provide shoulder belt guides 36, 38 formed to include additional slots.

Headrest 14 of seat 10 includes a back plate 42 and first and second wing members 44, 46 coupled to opposite edges of back plate 42 and positioned to lie in spaced-apart relation to one another. Each wing member 44, 46 is oriented to lie at an angle relative to back plate 42, as shown in FIGS. 1 and 2, for example. A rear surface 43 of back plate 42 lies adjacent to and engages a front, planar surface or a back support surface 48 of back support portion 24, as shown in FIGS. 5 and 8. Similarly, wing members 44, 46 lie adjacent to and may engage respective side walls 28, 30 of seat shell 18. As is discussed in greater detail below, apertures 50 are formed through back plate 42 of headrest 14 for receiving fasteners 52 therethrough to couple headrest 14 to a portion of height-adjustment mechanism 12 which moves upwardly and downwardly with headrest 14 relative to seat shell 18.

As mentioned above, a small offset distance 100 is provided between mating or adjacent portions of headrest 14 and back support portion 24. This small offset distance 100 provides a smooth and continuous backrest surface for the juvenile. Illustratively, offset distance 100 is measured between back support surface 48 of back support portion 24 and a planar front surface 102 of back plate 42 of headrest 14. Illustratively, offset distance 100 meets the FSMV213 requirements for the year 2004 which require the offset distance for the backrest surface of all juvenile vehicle seats to be less than ⅜ (0.375) inch (9.53 mm).

The up and down movement of headrest 14 relative to seat shell 18 functions to raise and lower headrest 14 above bottom seat portion 16 to adapt seat 10 to accommodate small-and large-sized juveniles. Thus, headrest 14 moves up and down relative to seat shell 18 to assure proper fit for a juvenile seated in seat 10. A caregiver can raise and lower headrest 14 to change the height of headrest 14 by operating height-adjustment mechanism 12. As is discussed in greater detail below, the height of headrest 14 above bottom seat portion 16 may be adjusted by a caregiver from either a position facing the front of the seat 10, as shown in FIGS. 5-8, or from a position facing the rear of seat 10, as shown in FIGS. 9 and 10. Thus, height-adjustment mechanism 12 can be actuated from the front and from the rear to allow the user to adjust the height of headrest 14 from the front or rear of the seat 10.

Height-adjustment mechanism 12 includes two actuators 54, 56 coupled to headrest 14. Each actuator 54, 56 is coupled to back plate 42 of headrest 14, and is positioned adjacent a rear side 58 of back support portion 24. Illustratively, therefore, a back support surface 60 of back support portion 24 is positioned between headrest 14 and the actuators 54, 56. The positioning of the actuators 54, 56 on the rear side 58 of the back support portion 24 allows a user to actuate and move the height-adjustment mechanism 12 to an unlocked position to allow a user to move the headrest 14 up and down relative to the seat shell 18 from the rear side 58 of the seat 10. Further, as is discussed in greater detail below, a user may also actuate and move the height-adjustment mechanism 12 to the unlocked position from a front side 62 of the seat 10. The positioning of actuators 54, 56 on the rear side 58 of back support portion 24 contributes to providing small offset distance 100 discussed above and shown in FIG. 5. As is discussed in greater detail below, actuators 54, 56 operate to bias headrest 14 to a locked position to prevent up and down movement of headrest 14 relative to the seat shell 18.

Figure 3:
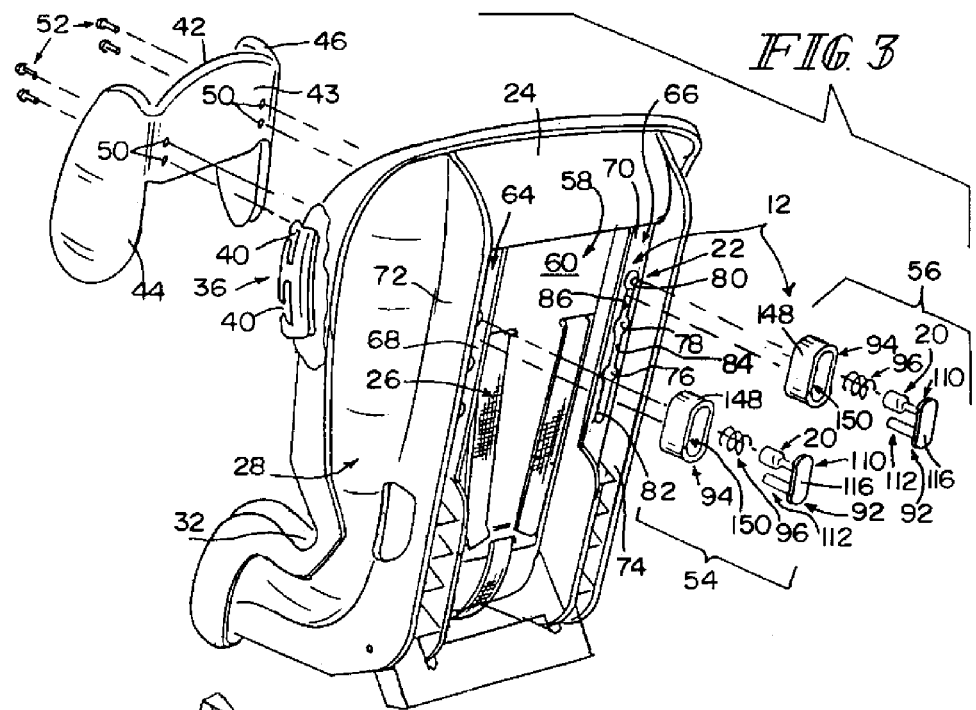
FIG. 3 is a rear perspective, exploded view of the seat of FIGS. 1 and 2 showing a height-adjustment mechanism for raising and lowering the headrest above the bottom seat portion of the seat, the height-adjustment mechanism having two actuators each including an engagement bracket coupled to the headrest and having two spaced-apart pins or posts, a spring to be positioned over one of the posts, and a shroud to enclose the engagement bracket and spring, and further showing vertical slots of the height-adjustment mechanism provided in the seat shell and formed to receive the posts of the engagement bracket therethrough.
Figure 4:
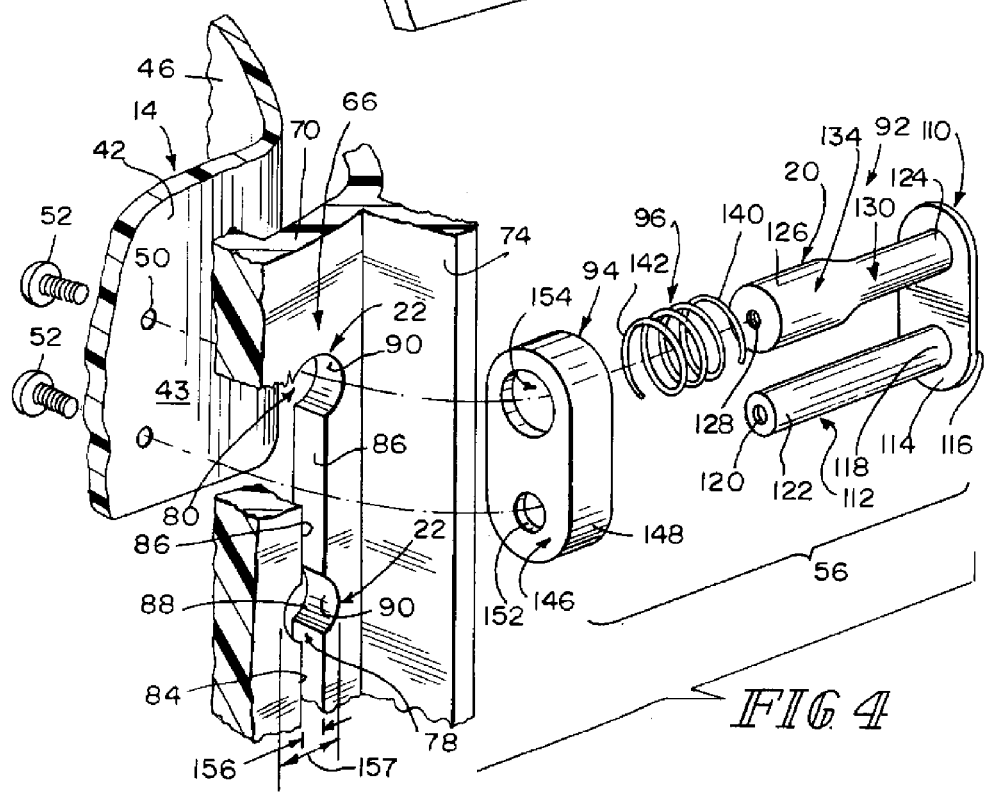
FIG. 4 is an exploded, perspective view with portions broken away of one of the actuators of the height-adjustment mechanism showing a first, constant diameter post or guide pin of the engagement bracket and a second, variable diameter post or locking pin of the engagement bracket, each of which are received through the respective vertical slot provided in the seat shell, and further showing the shroud and spring of the actuator to be coupled to the engagement bracket.

As shown in FIGS. 3 and 4, height-adjustment mechanism includes a pair of vertical slots 64, 66 of the height-adjustment mechanism 12 provided in the back support portion 24 of seat shell 18. Specifically, vertical slots 64, 66 are provided in respective flange members 68, 70 of back support portion 24. Seat shell 18 further includes support ribs 72, 74 coupled to a rear surface 60 of back support portion 24 such that flange 68 with vertical slot 64 is adjacent support rib 72 and flange 70 with vertical slot 66 is adjacent support rib 74. As shown best in FIG. 3, vertical slots 64, 66 are spaced-apart from each other such that child-restraint harness 26 is positioned therebetween. Although illustrative seat 10 includes two vertical slots 64, 66 provided in back support portion 24 and positioned in spaced-apart relation to each other, it is within the scope of this disclosure to provide a seat 10 having any number of vertical slots which are positioned at other suitable locations on seat 10. Further, it is within the scope of this disclosure to provide vertical slots 64, 66 on portions of seat 10 other than back support portion 24.

As shown best in FIGS. 3 and 4, each vertical slot 64, 66 defines three position apertures or position indicators 22 formed therein. A lowest position indicator 76 corresponds to a lowest position of headrest 14 above bottom seat portion 16, as shown in FIG. 1, for example. A middle position indicator 78 similarly corresponds to a middle position of headrest 14 while a highest position indicator 80 corresponds to a highest position of headrest 14, as shown in FIG. 2, for example. Illustratively, each vertical slot 64, 66 includes the three position indicators 76, 78, 80 mentioned above; however, it is within the scope of this disclosure for each vertical slot 64, 66 to define any suitable number of position indicators to represent any number of positions of headrest 14 above bottom seat portion 16.

Each vertical slot 64, 66 therefore, defines position indicators 76, 78, 80 which are each spaced-apart from each other and vertical segments 82, 84, 86 which are also each spaced-apart from each other. Illustratively, each position indicator 76, 78, 80 is adjacent at least one vertical segment 82, 84, 86 and each vertical segment 82, 84, 86 is adjacent at least one of the position indicators 76, 78, 80 such that vertical segments 82, 84, 86 are alternatingly spaced with position indicators 76, 78, 80. As shown in FIGS. 3 and 4, position indicators 76, 78, 80 are substantially circular in shape and are defined by bulging edges 88, 90 of each respective vertical slot 64, 66. Each position indicator 76, 78, 80, therefore, is wider than the vertical segments 82, 84, 86 of each vertical slot 64, 66. As is discussed in greater detail below, a portion of each actuator 54, 56 is received within vertical slots 64, 66.

The actuators 54, 56 are identical to each other; therefore, reference is made only to the left actuator 56 shown in FIGS. 5-10. Actuator 56 includes an engagement bracket 92 coupled to the headrest 14, a shroud 94 surrounding the engagement bracket 92, and a spring 96 coupled to the engagement bracket 92 and engaged with the engagement bracket 92 at one end and with a portion of the shroud 94 at another end.

Engagement bracket 92 of each actuator 54, 56 includes a base member 110, a first post or guide pin 112 coupled to base member 110, and second post or locking pin 20 coupled to base member 110, spaced-apart from first post 112, and positioned generally parallel to first post 112. Illustrative base member 110 is oval in shape and includes a front surface 114 and a rear surface 116; however, it is within the scope of this disclosure for base member to be any suitable shape. Guide pin 112 is cylindrical in shape to define a substantially constant or unchanging diameter along a length of guide pin 112, as shown in FIG. 4. A first end 118 of guide pin 112 is coupled to front surface 114 of base 110. A threaded bore 120 is formed in a second end 122 of guide pin 112.

Second post or locking pin 20 similarly includes a first end 124 coupled to front surface 114 of base 110 and a second end 126 having a threaded bore 128 formed therein. Locking pin 20 is a variable diameter post or pin such that locking pin 20 includes a first portion 130 coupled to base 110 and having a first diameter 132 (shown in FIG. 5) and a second portion 134 coupled to the first portion 130 and having a second diameter 136 (shown in FIG. 5) larger than the first diameter 134. Illustratively, a diameter 138 of the guide pin 112 is 0.400 inch (1.02 mm), the diameter 132 of the first portion 130 of the locking pin 20 is 0.400 inch (1.02 mm), and the diameter 136 of the second portion 134 of the second post or locking pin 20 is 0.820 inch (2.08 mm).

As mentioned above, each pin 20, 112 is formed to include a threaded bore 128, 120 respectively. Threaded bores 128, 120 each receive a fastener, such as illustrative screw 52, therein in order to couple headrest 14 to each actuator 54, 56. Thus, illustrative screws 52 are received through apertures 50 formed in back plate 42 of headrest 14 and are received within threaded bores 128, 120 of each respective post 20, 112 to attach each engagement bracket 92 to headrest 14. Thus, each engagement bracket 92 is movable up and down with headrest 14 as the height of headrest 14 is adjusted above bottom seat portion 16. As shown in FIGS. 5-10, pins 20, 112 extend through vertical slots 64, 66 provided in back support portion 24 in order to couple with headrest 14. Further illustratively, pins 20, 112 are coupled rigidly to headrest 14 such that pins 20, 112 and headrest 114 are immovable relative to each other. In other words, both pins 20, 112 and headrest 14 move upwardly and downwardly together relative to seat shell 18 and, as is discussed in greater detail below, pins 20, 112 and headrest 14 also move back and forth horizontally together relative to seat shell 18.

Spring 96 of each actuator 54, 56 is received about the locking pin 20 of engagement bracket 92 of each respective actuator 54, 56. A first end 140 of spring 96 engages front surface 114 of base 110 and a second end 142 of spring 96 engages an inner surface 144 of shroud 94 to urge respective locking pin 20 to a locked position within a position indicator 22 to prevent headrest 14 from being moved upwardly or downwardly relative to seat shell 18. As is discussed in greater detail below, locking pin 20, spring 96, base 110, and vertical slots 64, 66 cooperate to provide locking means for preventing up and down movement of the headrest 14 relative to the seat shell 18. The locking means also permits back and forth movement of the headrest 14 relative to the seat shell 18 in a direction generally perpendicular to the back support portion 24 of the seat shell 18.

As shown in FIG. 4, shroud 94 of each actuator 54, 56 is substantially oval in shape and includes an oval end wall 146 defining inner surface 144 and a side wall or outer rim 148 coupled to end wall 146. End wall 146 and side wall 148 cooperate to define a cavity 150 formed to receive a portion of respective engagement bracket 92, as shown in FIGS. 5 and 6, for example. A first aperture 152 is formed through end wall 146 and a second aperture 154, spaced-apart from first aperture 152 is also formed through end wall 146. Second aperture 154 is larger than first aperture 152 and is formed to receive the second, wider portion 134 of locking pin 20 therethrough, as shown in FIGS. 5 and 6. First aperture 152 is formed to receive the guide pin 112 therethrough. End wall 146 of shroud 94 is positioned adjacent to and engaged with respective flange members 68, 70 of back support portion 24.

As mentioned above, actuators 54, 56, and thus headrest 14, are movable between locked and unlocked positions. In the locked position, as shown in FIGS. 5 and 8, headrest 14 is prevented from moving upwardly and downwardly relative to seat shell 18, whereas in the unlocked position, as shown in FIGS. 6, 7, 9, and 10, headrest 14 is permitted to move upwardly and downwardly relative to seat shell 18. As shown in FIGS. 5 and 8, second, wider portion 134 of locking pin 20 is received within one of the three position indicators 22 of the respective vertical slot 66 when the actuator 56 is in the locked position.

Diameter 136 of wider portion 134 is greater than a width 156 of the vertical segments 82, 84, 86 (shown in FIG. 4) of each vertical slot 64, 66 to prevent locking pin 20 (and thus actuators 54, 56 and headrest 14) from being able to move upwardly or downwardly when wider portion 134 locking pin is received within one of the position indicators 22. Further, a width 157 of each position indicator 22 is greater than the width 156 of the vertical segments 82, 84, 86, but is large enough to receive second portion 134 of locking pin 20 therethrough. Guide pin 112, having a smaller diameter 138 than that of second portion 134 of locking pin 20, is received within one of the vertical segments 82, 84, 86 of respective vertical slots 64, 66 positioned adjacent to and below the particular position indicator 22 within which second portion 134 of locking pin 20 is positioned when engagement bracket 92 is in the locked position.

Figure 7:
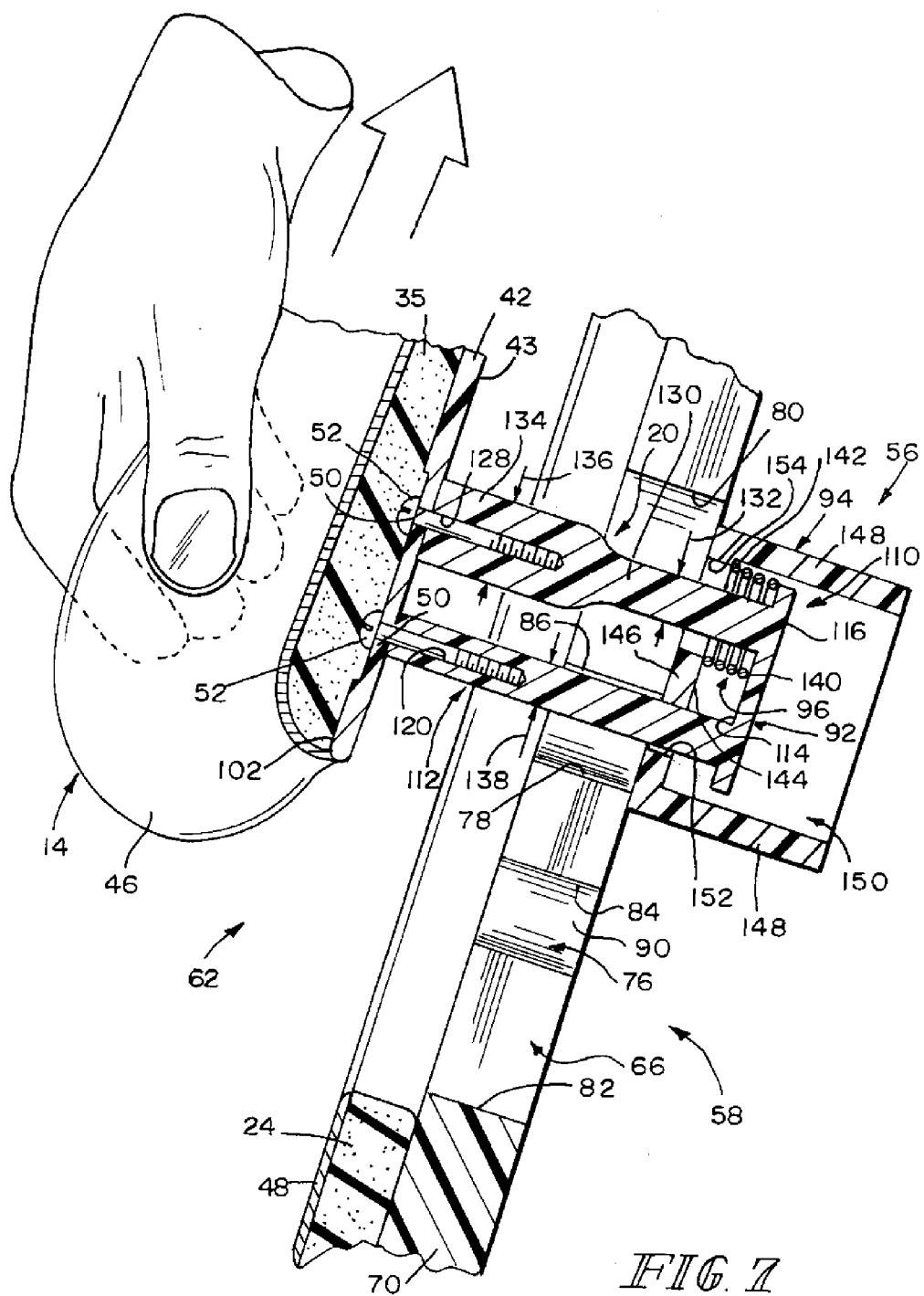
FIG. 7 is a sectional view similar to FIGS. 5 and 6 showing the actuator in the unlocked position and showing the user having moved the headrest (with the actuator) upwardly from the lowest position (shown in FIG. 5) toward a highest position (shown in FIG. 8) in order to adjust a height of the headrest above the bottom seat portion of the seat shell.
Figure 8:
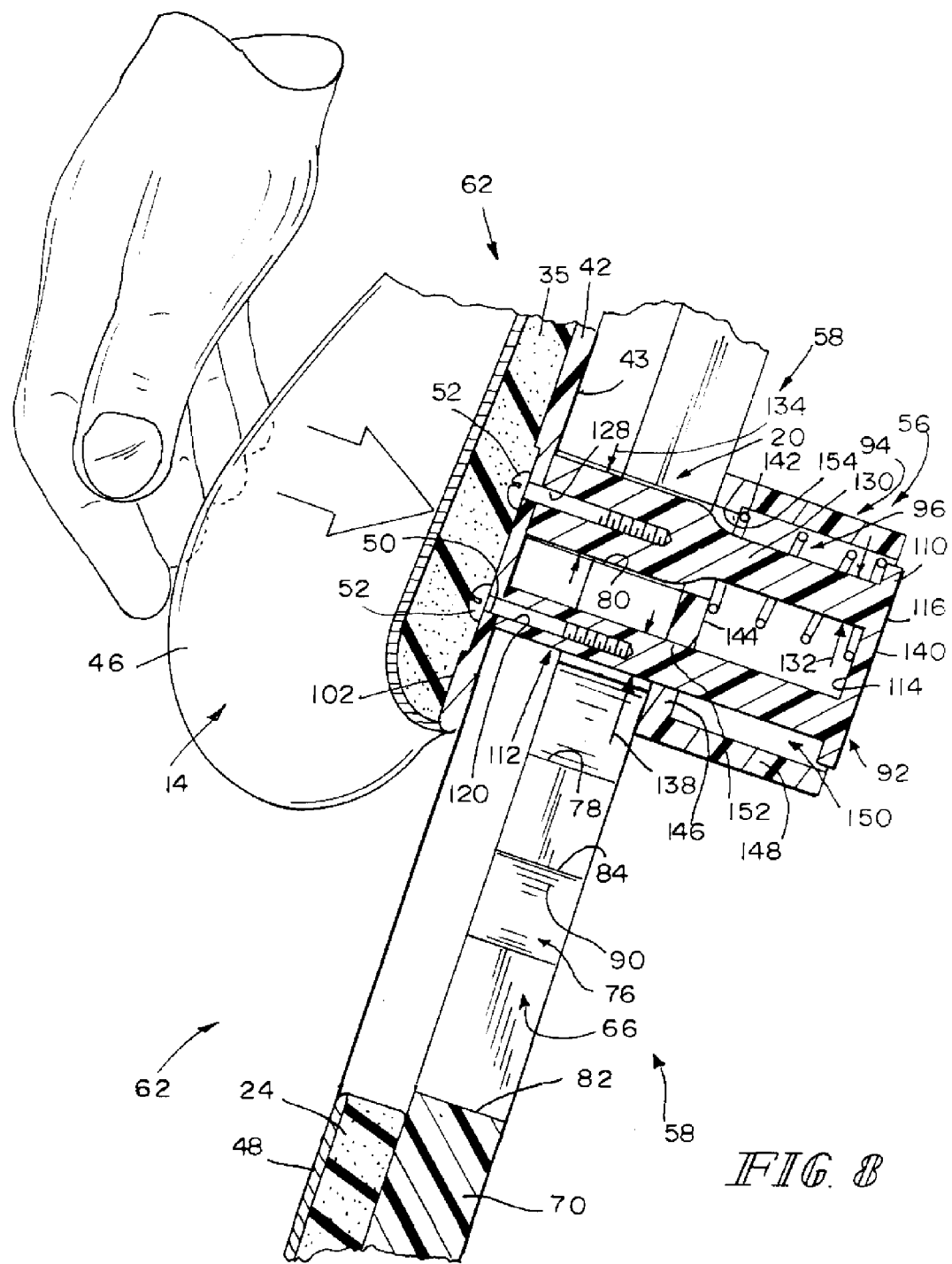
FIG. 8 is a sectional view similar to FIGS. 5-7 showing the user having released the headrest (after moving the headrest upwardly) to allow the spring of the actuator to bias the headrest to the locked position.

Looking now to FIGS. 6-8, a first method or means for moving headrest 14 and actuators 54, 56 to the unlocked position and adjusting the height of headrest 14 above bottom seat portion 16 is provided. This first method allows a user to adjust the height of headrest 14 from the front of seat 10. As shown in FIG. 6, a user grabs headrest 14 and pulls headrest 14 in a direction away from back support portion 24. Illustratively, the user is shown to grab the wing member 46 of headrest 14; however, it is within the scope of this disclosure for the user to grab any portion of headrest 14 when moving headrest 14 away from back support portion 24 toward the unlocked position. As shown in FIGS. 6-8, the headrest 14, locking pin 20, and guide pin 112 move horizontally in a direction generally perpendicular to a plane formed through the back support portion 24 when moving between the locked and unlocked positions. As shown in FIG. 6, therefore, back plate 42 of headrest 14 is spaced-apart from back support surface 48 of back support portion 24 in the unlocked position and is engaged with back support surface 48 in the locked position.

As headrest 14 is moved away from back support portion 24, back plate 110 of engagement bracket 92 of each actuator 54, 56 is moved against the bias of each respective spring 96 to move locking pin 20 and guide pin 112 with headrest 14 such that second, wider portion 134 of locking pin 20 is removed from within lowest position indicator 76 and first, narrower portion 130 of locking pin 20 is received within position indicator 76. Diameter 132 of first, narrower portion 130 of locking pin 20 is slightly smaller than width 156 of vertical segments 82, 84, 86 of vertical slots 64, 66. As mentioned above, the diameter 138 of the guide pin 112 is also slightly smaller than width 156 of vertical segments 82, 84, 86. Therefore, in the unlocked position, headrest 14 with actuators 54, 56 is movable upwardly and downwardly relative to seat shell 18. As headrest 14 is moved upwardly, as shown in FIG. 7, for example, guide pin 112 and first, narrower portion 130 of locking pin 20 slide within vertical segments 82, 84, 86 and position indicators 22 of vertical slots 64, 66.

Once the headrest 14 has been moved to the desired height above bottom seat portion 16, the user or caregiver releases headrest 14, as shown in FIG. 8, and the spring 96 of each actuator 54, 56 acts to bias engagement brackets 92 to the locked position. Headrest 14, which is coupled to engagement brackets 92, is therefore biased in a direction toward back support portion 24 such that second portion 134 of locking pin 20 is received within a position indicator 22. Thus, headrest 14 and actuators 54, 56 are in the locked position and headrest is prevented from moving up or down relative to seat shell 18.

A second method or means of moving actuators 54, 56 to the unlocked position in order to raise or lower headrest 14 above bottom seat portion 16 of seat shell 18 is shown in FIGS. 9 and 10. This second method allows the user or caregiver to adjust the height of the headrest 14 from the rear side of the seat 10. As shown in FIG. 9, the user may depress engagement brackets 92 of each actuator 54, 56 against the bias of each spring 96 by pushing against outer or rear surface 116 of base 110 of each respective engagement bracket 92. As shown in FIGS. 9 and 10, the action of pushing against the engagement brackets 92 from the rear of the seat 10 moves headrest 14 in a direction away from back support portion 24 and disengages second, wider portion 134 of locking pin 20 from within one of the position indicators 22 of respective vertical slots 64, 66. Once in the unlocked position, the first, narrower portion 130 of locking pin 20 and guide pin 112 are able to move upwardly and downwardly within respective vertical slots 64, 66 to adjust the height of headrest 14 above bottom seat portion 16.

The invention claimed is:

1. A juvenile seat comprising a seat shell including a bottom seat portion and a back support portion coupled to the bottom seat portion and positioned at an angle relative to the bottom seat portion, a headrest coupled to the seat shell and arranged for up and down movement relative to the seat shell to adjust a height of the headrest above the bottom seat portion of the seat shell, the headrest having a rear surface engaged with a back support surface of the back support portion, and a height-adjustment mechanism including a locking pin coupled to the headrest for up and down movement with the headrest and a vertical slot provided to open in a generally flat area in the back support portion of the seat shell and formed to receive the locking pin therethrough, the vertical slot defining vertically-spaced position indicators extending in the width direction of the slot formed to receive the locking pin in a locked position to prevent the headrest from moving upwardly and downwardly relative to the seat shell.

2. A juvenile seat comprising a seat shell including a bottom seat portion and a back support portion coupled to the bottom seat portion and positioned at an angle relative to the bottom seat portion, a headrest coupled to the seat shell and arranged for up and down movement relative to the seat shell to adjust a height of the headrest above the bottom seat portion of the seat shell, the headrest having a rear surface engaged with a back support surface of the back support portion, and a height-adjustment mechanism including a locking pin coupled to the headrest for up and down movement with the headrest and a vertical slot provided in the back support portion of the seat shell and formed to receive the locking pin therethrough, the vertical slot defining vertically-spaced position indicators formed to receive the locking pin in a locked position to prevent the headrest from moving upwardly and downwardly relative to the seat shell, wherein the locking pin includes a first portion having a first diameter and a second portion coupled to the first portion and having a second diameter larger than the first diameter, and wherein the second portion of the locking pin is positioned within one of the position indicators in the locked position and is disengaged from the position indicators in an unlocked position to permit the headrest to move upwardly and downwardly relative to the seat shell.

3. The juvenile seat of claim 2, wherein the vertical slot further includes vertical segments having a width smaller than the second diameter of the locking pin.

4. The juvenile seat of claim 3, wherein the width of the vertical segments is larger than the first diameter of the locking pin.

5. The juvenile seat of claim 2, wherein the second portion of the locking pin is coupled to the headrest.

6. The juvenile seat of claim 5, wherein the second portion of the locking pin includes an aperture, the headrest includes an aperture, and the aperture of the locking pin and the aperture of the headrest are each formed to receive a fastener to couple the headrest to the locking pin.

7. The juvenile seat of claim 2, further comprising a spring formed to bias the second portion of the locking pin into one of the position indicators of the vertical slot.

8. The juvenile seat of claim 7, wherein the height-adjustment mechanism further includes a shroud member having an aperture formed to receive the locking pin therethrough and a base member coupled to the first portion of the locking pin and wherein a first end of the spring is engaged with the shroud member and a second end of the spring is engaged with the base member.

9. The juvenile seat of claim 1, wherein the locking pin is a first locking pin, the vertical slot is a first vertical slot, and the height-adjustment mechanism includes a second locking pin coupled to the headrest and spaced-apart from the first locking pin and a second vertical slot provided in the back support portion of the seat shell and spaced-apart from the first vertical slot, and wherein the second locking pin is received through the second vertical slot.

10. A juvenile seat comprising a seat shell including a bottom seat portion and a back support portion coupled to the bottom seat portion and positioned at an angle relative to the bottom seat portion, a headrest coupled to the seat shell and arranged for up and down movement relative to the seat shell to adjust a height of the headrest above the bottom seat portion of the seat shell, the headrest having a rear surface engaged with a back support surface of the back support portion, and a height-adjustment mechanism including a locking pin coupled to the headrest for up and down movement with the headrest and a vertical slot provided in the back support portion of the seat shell and formed to receive the locking pin therethrough, the vertical slot defining vertically-spaced position indicators formed to receive the locking pin in a locked position to prevent the headrest from moving upwardly and downwardly relative to the seat shell,
wherein the height-adjustment mechanism further includes a guide pin coupled to the headrest and spaced-apart from the locking pin.

11. The juvenile seat of claim 10, wherein the guide pin is received through the vertical slot.

12. The juvenile seat of claim 11, wherein the headrest is arranged to move with the locking pin and the guide pin in a direction generally perpendicular to a plane of the back support portion.

13. The juvenile seat of claim 10, wherein the guide pin is vertically spaced-apart from the locking pin.

14. The juvenile seat of claim 13, wherein the vertical slot further includes vertical segments alternatingly spaced between the position indicators and wherein second portion of the locking pin is positioned within one of the position indicators in the locked position and the guide pin is positioned within one of the vertical segments in the locked position.

15. The juvenile seat of claim 14, wherein the vertical slot includes three position indicators and three vertical segments.

16. The juvenile seat of claim 10, wherein the locking pin includes a first portion having a first diameter and a second portion coupled to the first portion and having a second diameter larger than the first diameter and wherein the guide pin has a guide-pin diameter smaller than the second diameter of the locking pin.

17. The juvenile seat of claim 10, wherein the guide pin and the locking pin are immovable relative to the headrest.

18. The juvenile seat of claim 10, wherein the height-adjustment mechanism further includes a base member and the first portion of the locking pin is coupled to a base member and the guide pin is coupled to the base member.

19. The juvenile seat of claim 18, wherein the locking pin, guide pin, and base member are spring-biased to the locked position by a spring of the height-adjustment mechanism positioned around the locking pin.

20. The juvenile seat of claim 1, wherein the height-adjustment mechanism further includes a shroud member engaged with the back support portion of the headrest and formed to define an aperture aligned with the vertical slot and wherein the locking pin is received through the aperture of the shroud.

21. A juvenile seat comprising a seat shell including a bottom seat portion and a back support portion coupled to the bottom seat portion and positioned at an angle relative to the bottom seat portion, a headrest coupled to the seat shell and arranged for up and down movement relative to the seat shell to adjust a height of the headrest above the bottom seat portion of the seat shell, the headrest having a rear surface engaged with a back support surface of the back support portion, and a height-adjustment mechanism including a locking pin coupled to the headrest for up and down movement with the headrest and a vertical slot provided in the back support portion of the seat shell and formed to receive the locking pin therethrough, the vertical slot defining vertically-spaced position indicators formed to receive the locking pin in a locked position to prevent the headrest from moving upwardly and downwardly relative to the seat shell,
wherein the height-adjustment mechanism further includes a shroud member engaged with the back support portion of the headrest and formed to define an aperture aligned with the vertical slot and wherein the locking pin is received through the aperture of the shroud, and
wherein the height-adjustment mechanism further includes a base member coupled to the locking pin, the shroud includes a end wall engaged with the back support portion of the seat shell and an outer rim coupled to the end wall to cooperate with the end wall to define a cavity formed to receive the base member therein.

22. The juvenile seat of claim 21, wherein the height-adjustment mechanism further includes a spring positioned around the locking pin and having a first end engaged with the base member and a second end engaged with the end wall of the shroud to bias the locking pin in a direction toward the back support portion.

23. The juvenile seat of claim 21, wherein the height-adjustment mechanism further includes a guide pin coupled at a first end to the base and coupled at a second end to the headrest and spaced-apart from the locking pin and wherein the guide pin is received within the vertical slot.

24. The juvenile seat of claim 23, wherein the aperture of the shroud is a first aperture formed in the end wall of the shroud, the end wall of the shroud is further formed to define a second aperture, and the guide pin is received through the second aperture of the end wall.

25. The juvenile seat of claim 20, wherein the back support portion of the seat shell is positioned between the headrest and the shroud.

26. A juvenile seat comprising a seat shell including a bottom seat portion and a back support portion coupled to the bottom seat portion and positioned at an angle relative to the bottom seat portion, a headrest coupled to the seat shell and arranged for up and down movement relative to the seat shell to adjust a height of the headrest above the bottom seat portion of the seat shell, the headrest having a rear surface engaged with a back support surface of the back support portion, and a height-adjustment mechanism including a locking pin coupled to the headrest for up and down movement with the headrest and a vertical slot provided in the back support portion of the seat shell and formed to receive the locking pin therethrough, the vertical slot defining vertically-spaced position indicators formed to receive the locking pin in a locked position to prevent the headrest from moving upwardly and downwardly relative to the seat shell, wherein the locking pin and the headrest are arranged to move horizontally relative to the back support portion of the seat shell in a direction generally perpendicular to the back support portion of the seat shell such that the rear surface of the headrest is engaged with the back support surface of the back support portion in the locked position and is spaced-apart from the back support surface of the back support portion in an unlocked position to permit the headrest to move upwardly and downwardly relative to the seat shell.

27. A juvenile seat comprising a seat shell including a bottom seat portion and a back support portion coupled to the bottom seat portion and positioned at an angle relative to the bottom seat portion, a headrest coupled to the seat shell and arranged for up and down movement relative to the seat shell to adjust a height of the headrest above the bottom seat portion of the seat shell, and a locking pin coupled to the headrest for up and down movement with the headrest, the locking pin being formed to extend in a direction away from the headrest generally perpendicular to a plane defined by a back plate portion of the headrest, and a position indicator in the form of a hole provided within the back support portion of the seat shell and formed to receive the locking pin so that the locking pin extends through the hole and outwardly from a back region of the hole.

28. A juvenile seat comprising a seat shell including a bottom seat portion and a back support portion coupled to the bottom seat portion and positioned at an angle relative to the bottom seat portion, a headrest coupled to the seat shell and arranged for up and down movement relative to the seat shell to adjust a height of the headrest above the bottom seat portion of the seat shell, and a locking pin coupled to the headrest for up and down movement with the headrest, the locking pin being formed to extend in a direction away from the headrest generally perpendicular to a plane defined by a back plate portion of the headrest, and a position indicator provided within the back support portion of the seat shell and formed to receive the locking pin therethrough, wherein the headrest is coupled to a first end of the locking pin, and further including a base member coupled to a second end of the locking pin and arranged such that the back support surface of the back support portion is positioned between the headrest and the base member.

29. The juvenile seat of claim 27, wherein the locking pin is rigidly coupled to the headrest and the locking pin and the headrest are arranged to move horizontally relative to the seat shell in a plane generally perpendicular to the back support portion of the seat shell between a locked position to prevent movement of the headrest relative to the seat shell and an unlocked position to permit movement of the headrest relative to the seat shell.

30. The juvenile seat of claim 29, wherein a back plate of the headrest engages a back support surface of the back support portion in the locked position and is spaced-apart from the back support surface of the back support portion in the unlocked position.

31. The juvenile seat of claim 29, further comprising a vertical slot formed in the back support portion of the seat shell and formed to include the position indicator.

32. The juvenile seat of claim 31, wherein the vertical slot includes a plurality of position indicators and vertical segments alternatingly spaced with the position indicators and wherein the locking pin is positioned within one of the plurality of position indicators in the locked position.

33. A juvenile seat comprising a seat shell including a bottom seat portion and a back support portion coupled to the bottom seat portion and positioned at an angle relative to the bottom seat portion, a headrest coupled to the seat shell and arranged for up and down movement relative to the seat shell to adjust a height of the headrest above the bottom seat portion of the seat shell, and a locking pin coupled to the headrest for up and down movement with the headrest, the locking pin being formed to extend in a direction away from the headrest generally perpendicular to a plane defined by a back plate portion of the headrest, and a position indicator provided within the back support portion of the seat shell and formed to receive the locking pin therethrough, wherein the locking pin is rigidly coupled to the headrest and the locking pin and the headrest are arranged to move horizontally relative to the seat shell in a plane generally perpendicular to the back support portion of the seat shell between a locked position to prevent movement of the headrest relative to the seat shell and an unlocked position to permit movement of the headrest relative to the seat shell, further comprising a vertical slot formed in the back support portion of the seat shell and formed to include the position indicator, wherein the vertical slot includes a plurality of position indicators and vertical segments alternatingly spaced with the position indicators and wherein the locking pin is positioned within one of the plurality of position indicators in the locked position, and wherein the locking pin includes a first portion having a first diameter and a second portion coupled to the first portion and having a second diameter larger than the first diameter, and wherein a width of each position indicator is larger than a width of each vertical segment.

34. The juvenile seat of claim 33, wherein the diameter of the second portion of the locking pin is larger than the width of the vertical segments.

35. A juvenile seat comprising a seat shell including a bottom seat portion and a back support portion coupled to the bottom seat portion and positioned at an angle relative to the bottom seat portion, a headrest coupled to the seat shell and arranged for up and down movement relative to the seat shell to adjust a height of the headrest above the bottom seat portion of the seat shell, and a locking pin coupled to the headrest for up and down movement with the headrest, the locking pin being formed to extend in a direction away from the headrest generally perpendicular to a plane defined by a back plate portion of the headrest, and a position indicator provided within the back support portion of the seat shell and formed to receive the locking pin therethrough, wherein the locking pin is rigidly coupled to the headrest and the locking pin and the headrest are arranged to move horizontally relative to the seat shell in a plane generally perpendicular to the back support portion of the seat shell between a locked position to prevent movement of the headrest relative to the seat shell and an unlocked position to permit movement of the headrest relative to the seat shell, further comprising a vertical slot formed in the back support portion of the seat shell and formed to include the position indicator, wherein the vertical slot includes a plurality of position indicators and vertical segments alternatingly spaced with the position indicators and wherein the locking pin is positioned within one of the plurality of position indicators in the locked position, and wherein the vertical slot includes three position indicators to correspond to three different heights above the bottom seat portion of the seat shell and three vertical segments.

36. A juvenile seat comprising a seat shell including a bottom seat portion and a back support portion coupled to the bottom seat portion and positioned at an angle relative to the bottom seat portion, a headrest coupled to the seat shell and arranged for up and down movement relative to the seat shell to adjust a height of the headrest above the bottom seat portion of the seat shell, and a locking pin coupled to the headrest for up and down movement with the headrest, the locking pin being formed to extend in a direction away from the headrest generally perpendicular to a plane defined by a back plate portion of the headrest, and a position indicator provided within the back support portion of the seat shell and formed to receive the locking pin therethrough, wherein the locking pin includes a first portion having a first diameter and a second portion coupled to the first portion and having a second diameter larger than the first diameter and wherein the second portion is received within the position indicator in a locked position to prevent the headrest from moving upwardly and downwardly relative to the seat shell and the first portion is received within the position indicator in an unlocked position to permit the headrest to move upwardly and downwardly relative to the seat shell.

37. A juvenile seat comprising a seat shell including a bottom seat portion and a back support portion coupled to the bottom seat portion and position at an angle relative to the bottom seat portion, a headrest coupled to the seat shell and arranged for up and down movement relative to the seat shell to adjust a height of the headrest above the bottom seat portion of the seat shell, and means for locking the headrest to prevent up and down movement relative to the seat shell.

38. A juvenile seat comprising a seat shell including a bottom seat portion and a back support portion coupled to the bottom seat portion and position at an angle relative to the bottom seat portion, a headrest coupled to the seat shell and arranged for up and down movement relative to the seat shell to adjust a height of the headrest above the bottom seat portion of the seat shell, and means for locking the headrest to prevent up and down movement relative to the seat shell, wherein the locking means is configured to permit back and forth movement of the headrest relative to the seat shell in a direction generally perpendicular to the back support portion of the seat shell.

39. The juvenile seat of claim 37, wherein the locking means includes a locking pin coupled to the headrest for up and down and back and forth movement with the headrest, a vertical slot provided in the back support portion to receive the locking pin therethrough, and a spring coupled to the locking pin to bias the headrest in a direction toward the back support portion.

40. The juvenile seat of claim 39, wherein the vertical slot includes a plurality of position indicators vertically-spaced apart from each other along the back support portion of the seat shell to indicate a particular height of the headrest above the bottom seat portion of the seat shell and wherein the locking pin is positioned within one of the plurality of position indicators in the locked position.

41. A juvenile seat comprising a seat shell including a bottom seat portion and a back support portion coupled to the bottom seat portion and position at an angle relative to the bottom seat portion, a headrest coupled to the seat shell and arranged for up and down movement relative to the seat shell to adjust a height of the headrest above the bottom seat portion of the seat shell, and means for locking the headrest to prevent up and down movement relative to the seat shell, wherein the vertical slot includes a plurality of position indicators vertically-spaced apart from each other along the back support portion of the seat shell to indicate a particular height of the headrest above the bottom seat portion of the seat shell and wherein the locking pin is positioned within one of the plurality of position indicators in the locked position, wherein the locking means includes a locking pin coupled to the headrest for up and down and back and forth movement with the headrest, a vertical slot provided in the back support portion to receive the locking pin therethrough, and a spring coupled to the locking pin to bias the headrest in a direction toward the back support portion, and wherein the vertical slot further includes a vertical segment positioned between the position indicators, and wherein each position indicator has a first width greater than a second width of each vertical segment.

42. A juvenile seat comprising a seat shell including a bottom seat portion and a back support portion coupled to the bottom seat portion and position at an angle relative to the bottom seat portion, a headrest coupled to the seat shell and arranged for up and down movement relative to the seat shell to adjust a height of the headrest above the bottom seat portion of the seat shell, and means for locking the headrest to prevent up and down movement relative to the seat shell, wherein the locking means includes a locking pin coupled to the headrest for up and down and back and forth movement with the headrest, a vertical slot provided in the back support portion to receive the locking pin therethrough, and a spring coupled to the locking pin to bias the headrest in a direction toward the back support portion, and wherein the locking pin includes a first portion having a first diameter and a second portion coupled to the first portion and having a second diameter larger than the first diameter and wherein the headrest is coupled to the second portion.

43. The juvenile seat of claim 42, wherein the second portion of the locking pin is positioned within one of the position indicators in the locked position and the first portion of the locking pin is positioned within the vertical slot in the unlocked position.

* * * * *